(12) United States Patent
Milne et al.

(10) Patent No.: US 12,169,177 B2
(45) Date of Patent: Dec. 17, 2024

(54) CONTAINER VISUAL INSPECTION ASSEMBLY AND METHOD

(71) Applicant: AMGEN INC., Thousand Oaks, CA (US)

(72) Inventors: Graham F. Milne, Ventura, CA (US); Dmitry Fradkin, Woodland Hills, CA (US)

(73) Assignee: AMGEN INC., Thousand Oaks, CA (US)

( * ) Notice: Subject to any disclaimer, the term of this patent is extended or adjusted under 35 U.S.C. 154(b) by 190 days.

(21) Appl. No.: 17/786,742

(22) PCT Filed: Dec. 17, 2020

(86) PCT No.: PCT/US2020/065465
§ 371 (c)(1),
(2) Date: Jun. 17, 2022

(87) PCT Pub. No.: WO2021/127082
PCT Pub. Date: Jun. 24, 2021

(65) Prior Publication Data
US 2023/0027008 A1    Jan. 26, 2023

Related U.S. Application Data

(60) Provisional application No. 62/949,119, filed on Dec. 17, 2019.

(51) Int. Cl.
*G01N 21/88* (2006.01)
*G01N 21/90* (2006.01)
*G02B 5/30* (2006.01)

(52) U.S. Cl.
CPC ...... *G01N 21/8803* (2013.01); *G01N 21/8806* (2013.01); *G01N 21/9009* (2013.01); *G01N 2021/8848* (2013.01); *G02B 5/3025* (2013.01)

(58) Field of Classification Search
CPC .......... G01N 21/8803; G01N 21/8806; G01N 21/9009; G01N 2021/8848; G01N 21/9027; G01N 2201/104; G02B 5/3025
See application file for complete search history.

(56) References Cited

U.S. PATENT DOCUMENTS

| | | | | |
|---|---|---|---|---|
| 2,321,331 A | * | 6/1943 | Sweezey | G01N 21/909 356/240.1 |
| 5,444,539 A | * | 8/1995 | van der Grift | G01N 21/9027 356/239.6 |
| 5,528,026 A | * | 6/1996 | Burri | G01N 21/909 209/526 |

(Continued)

FOREIGN PATENT DOCUMENTS

| | | |
|---|---|---|
| CN | 101251493 A | 8/2008 |
| CN | 104662411 A | 5/2015 |

(Continued)

OTHER PUBLICATIONS

European Patent Application No. 20842105.7, Communication Pursuant to Article 94(3) EPC, dated Sep. 22, 2023.

(Continued)

*Primary Examiner* — Jonathan M Hansen
(74) *Attorney, Agent, or Firm* — MARSHALL, GERSTEIN & BORUN LLP

(57) ABSTRACT

Assemblies (10), devices, and methods are described herein that allow an examiner to inspect a container (12) of liquid product (14) through a bottom wall (18) of the container using a line-of-sight diversion member (28, e.g. beam splitter, mirror or prism). In some forms, the assemblies described herein can be provided with mounts and connecting arms to couple the devices to inspection booths.

18 Claims, 5 Drawing Sheets

(56) References Cited

U.S. PATENT DOCUMENTS

| | | | |
|---|---|---|---|
| 5,940,176 | A | 8/1999 | Knapp |
| 6,064,479 | A * | 5/2000 | Knapp ............... G01N 21/8806 356/240.1 |
| 7,667,846 | B2 | 2/2010 | Niedermeier |
| 8,179,597 | B2 | 5/2012 | Namba et al. |
| 9,377,398 | B2 * | 6/2016 | Itozaki ............... G01N 21/3577 |
| 9,541,506 | B2 | 1/2017 | Schorn et al. |
| 9,922,429 | B2 * | 3/2018 | Milne ................ G01N 15/1429 |
| 2004/0263838 | A1 * | 12/2004 | Diehr ..................... G01N 21/90 356/239.1 |
| 2006/0170924 | A1 | 8/2006 | Budd et al. |
| 2012/0127290 | A1 * | 5/2012 | Tojo ....................... G01N 21/41 348/61 |
| 2015/0369754 | A1 | 12/2015 | Buchwald et al. |
| 2019/0066288 | A1 | 2/2019 | Dudzik et al. |
| 2023/0018237 | A1 * | 1/2023 | Smith ....................... G01J 3/50 |

FOREIGN PATENT DOCUMENTS

| | | |
|---|---|---|
| DE | 202006013113 U1 | 1/2008 |
| EP | 3028031 B1 | 9/2019 |
| JP | S58123445 A | 7/1983 |
| JP | 2018154616 A | 10/2018 |
| WO | WO-2007139201 A1 | 12/2007 |
| WO | WO-2018156741 A1 | 8/2018 |

OTHER PUBLICATIONS

Search Report and Written Opinion in International Application No. PCT/US2020/065465 dated Apr. 22, 2021, 17 pages.
Bosch Packaging Technology, "MIH LX", 2017, https://web.archive.org/web/20170910161307/https://www.boschpackaging.com/en/pa/products/industries/pd/product-detail/mih-lx-18944.php<https://web.archive.org/web/20170910161307/https:/www.boschpackaging.com/en/pa/products/industries/pd/product-detail/mih-lx-18944.php>, 2 pages.
Phoenix Imaging, "MIB-100 Manual Inspection Booths", 2019, https://web.archive.org/web/20190908002646/http://www.phoeniximaging.com/MIB-100%20Inspection%20Booth.htm<https://web.archive.org/web/20190908002646/http:/www.phoeniximaging.com/MIB-100%20Inspection%20Booth.htm>, 4 pages.
Chinese Patent Application No. 2020800869947, Office Action, dated Sep. 30, 2024.

* cited by examiner

CONTAINER VISUAL INSPECTION ASSEMBLY AND METHOD

FIELD OF THE DISCLOSURE

The present disclosure generally relates to drug containers and, more particularly, to visual inspection of drug containers.

BACKGROUND

Every liquid biologic product is required under federal regulations to be inspected for defects that could affect its safety or efficacy. Several defect classes include particles suspended in the fluid. One method for detecting particles in the fluid is for an inspector to visually examine a container of a liquid biologic product using an inspection booth. Conventional inspection booth can include a light source and black and white background areas. The different background colors can help the inspector by making certain defects more readily visible. For particles specifically, the inspector can swirl the container of liquid biologic product in front of each background to observe for any suspended particles in solution. In some circumstances, the meniscus of the fluid results in an effectively blind volume within the container when viewed horizontally. For containers having a relatively low fill volume, the blind volume may make up a disproportionally large component of the overall fluid volume from the observer's perspective leaving an inspector unable to perform a reliable inspection orthogonally through the sidewall. Accordingly, improved systems and methods are needed.

SUMMARY

In accordance with a first aspect, a method for inspection of a container having liquid product therein is described that includes orienting the container in an upright configuration with a bottom wall of the container extending in a generally horizontal plane and disposing a line-of-sight diversion member below the container such that the bottom wall of the container is visible therethrough when viewed from a forward position in front of the container.

According to some forms, the method can include shifting the container and the line-of-sight diversion member laterally within an inspection booth to sequentially align the container and the line-of sight diversion member with white and black top surface portions of the inspection booth.

According to some forms, disposing the line-of-sight diversion member below the container can include disposing a beam splitter below the container and the method can include illuminating the container through the beam splitter with an illumination source. In further forms, the method can include filtering a line-of-sight through the beam splitter with one or more polarizers.

According to some forms, disposing the line-of-sight diversion member below the container can include coupling a mount to an inspection booth via first connection interface of the mount and coupling a connecting arm having a housing mounted thereto to the mount via a second connection interface of the mount, where the housing has the line-of-sight diversion member received therein. In further forms, coupling the connecting arm to the mount via the second connection interface can include disposing a slotted end of the connecting arm in an elongate opening of the mount, such that the connecting arm can be shifted laterally within the elongate opening or magnetically coupling magnet interfaces of the connecting arm and mount together.

In accordance with a second aspect, a container inspection assembly for use with an inspection booth is disclosed that includes a housing and a line-of-sight diversion member mounted to the housing and oriented to provide a redirected line-of-sight from a position forwardly of the housing to above the housing.

According to some forms, the container inspection assembly can include one or more of the following aspects: the line-of-sight diversion member can be a mirror, prism, or a beam splitter; the housing can include at least one of a front wall having a front opening therein or a top wall having a top opening therein, where the front opening or top opening having a shape corresponding to a cross-sectional shape of the container; one or more filters coupled to the housing and oriented to filter the redirected line-of-sight, where the one or more filters are orthogonal and/or linear polarizers; a light source coupled to the housing, where the light source oriented to illuminate a container positioned over the housing; a lens coupled to the housing to be within the redirected line-of-sight and configured to provide a magnification thereto; or an inspection booth including a top surface having black and white portions, which in a further forms can include light sources extending along front and rear edges of the black and white portions.

According to some forms, the container inspection assembly can include a mounting assembly that includes a connecting arm coupled to the housing and a mount having a first connection interface configured to couple to an inspection booth and a second connection interface configured to couple to the connecting arm. In one further form, the second connection interface can include an elongate opening and the connecting arm can include a slotted end configured to be slidably received within the elongate opening such that the connecting arm can be shifted laterally within the elongate opening. In another further form, the second connection interface can include a magnetic interface and the connecting arm can include a magnetic coupling disposed at an end thereof configured to couple to the magnetic interface. In yet a further form, the connecting arm can include a hinge allowing the housing to be movable with respect to the mount.

BRIEF DESCRIPTION OF THE DRAWINGS

The above needs are at least partially met through provision of the embodiments described in the following detailed description, particularly when studied in conjunction with the drawings, wherein.

DETAILED DESCRIPTION

Figure 1:
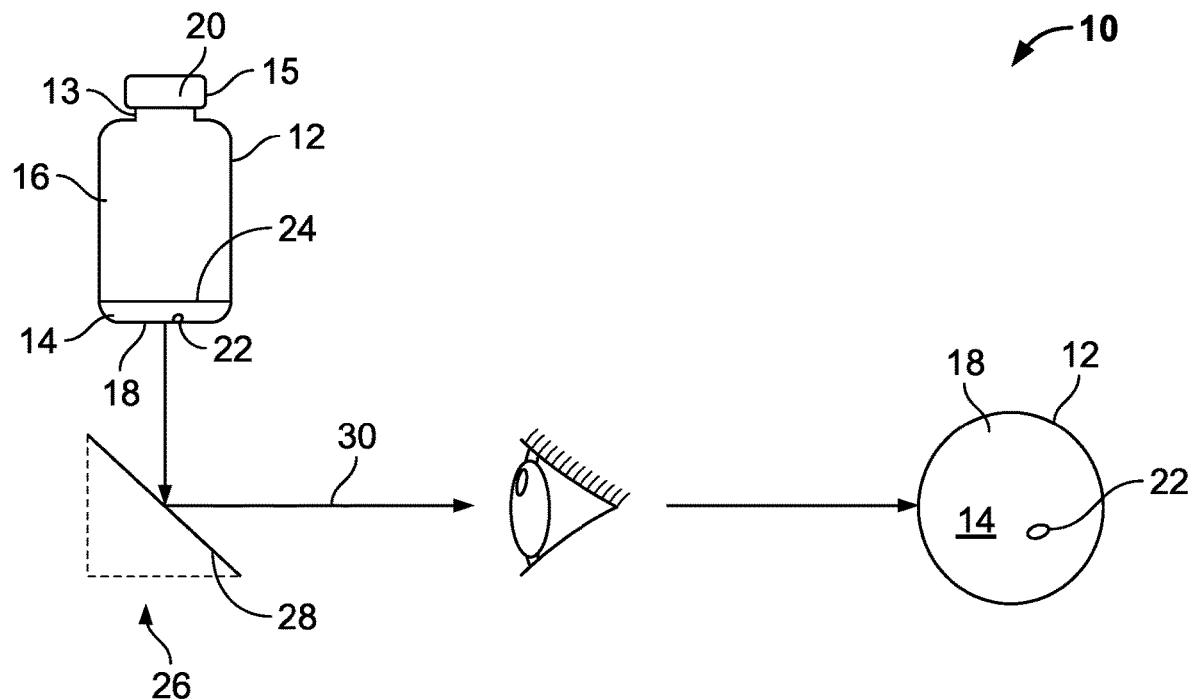
FIG. 1 is a diagrammatic view of a first example container inspection assembly in accordance with various embodiments.

Assemblies, devices, and methods are described herein that allow an examiner to inspect a container of liquid product through a bottom wall of the container using a line-of-sight diversion member. While suitable for containers of all shapes and sizes, the configurations described herein are particularly advantageous for containers having a low volume of liquid product such that a meniscus of the liquid product obscures some or a majority of the volume when viewed from a side of the container. In some forms, the assemblies described herein can be provided with mounts and connecting arms to couple the devices to inspection booths, such as commercially available inspection booths. In other forms, the assemblies described herein can be provided with handles and/or assemblies to aid in a user holding the devices and orienting the devices relative to the containers.

Details of example container inspection assemblies 10 are shown in FIGS. 1-8 that allow an examiner to visually inspect a container 12 having a liquid product 14 therein. The liquid product 14 can be a liquid biologic product or other liquid medicament, for example. The assembly 10 described herein is suitable for the visual inspection of a variety of suitable containers 12. For example, the container 12 can be a vial, ampoule, syringe, cartridge, or other reservoir. As shown, the container 12 includes a sidewall 16 that extends between a bottom wall 18 and an opposite, open end 20. In some cases, the liquid product 14 can have a defect in the form of one or more particles 22, but the particles 22 may be obscured from view due to a variety of reasons. For example, the container 12 may have a low volume of the liquid product 14 relative to the container sidewall, e.g., between about 1% and 10% of a height of the container 12 and, in some forms, between about 1% and 5% of a height of the container 12, 16 such that a meniscus 24 of the liquid product 14 obscures a portion or a majority of the horizontal view of the liquid product 14. Advantageously, the assembly 10 described herein includes a line-of-sight redirection device 26 that includes a diversion member 28 that allows an examiner positioned forwardly of the container 12 to have an upwardly directed view into the container 12 through the bottom wall 18.

Figure 2:
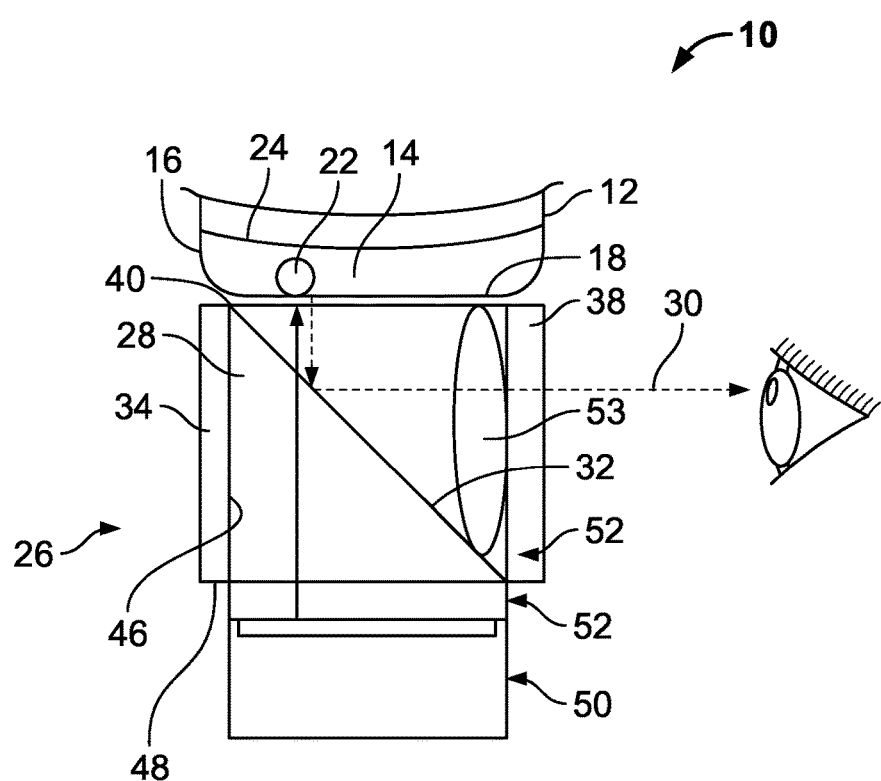
FIG. 2 is a diagrammatic view of a second example container inspection assembly in accordance with various embodiments.
Figure 3:
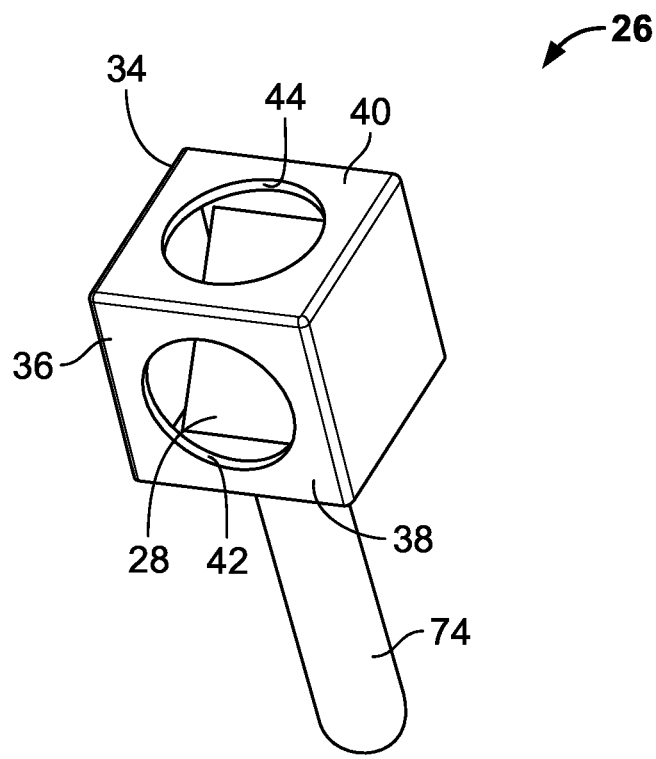
FIG. 3 is a perspective view of an example line-of-sight redirection device in accordance with various embodiments.

In a first example, as shown in FIG. 1, the diversion member 28 can be a mirror or prism disposed at a desired angle to direct a line-of-sight 30 upwardly, such as about 45 degrees to result in a directed line-of-sight 30 of 90 degrees as shown. In another example, as shown in FIG. 2, the diversion member 28 can be a beam splitter having a surface 32 disposed at a desired angle to direct a line-of-sight 30 upwardly, such as about 45 degrees to result in a directed line-of-sight 30 of 90 degrees as shown.

If desired, the device 28 can include a housing 34 having the diversion member 28 received therein for easy handling and orientation. In one example, shown in FIG. 3, the housing 34 can include one or more sidewalls 36, including a front wall 38 and a top wall 40. The front and top walls 38, 40 define front and top openings 42, 44 therein, respectively, that allow an examiner's view to extend through the front wall 38 and be directed through the top wall 40 by the diversion member 28. If desired, one or both of the openings 42, 44 can have a shape corresponding to a perimeter of a horizontal cross-section of the container sidewall 16, such as circular as shown, square, or other suitable shapes, to help an examiner in orienting the container 12 and housing 34 relative to one another.

Turning back to FIG. 2, the device 26 can also include one or more components that aid in inspection of the container 12 in conjunction with the beam splitter 28. For example, the device 10 can include an opaque surface 46 on a rear wall 48 behind the beam splitter 28 to restrict the line-of-sight 30 to the desired reflected angle. Further, a light source 50 can be disposed below the beam splitter 28 and oriented to project illumination through the beam splitter 28, the top opening 44, and the container bottom wall 18 to thereby illuminate any particles 22 in the liquid product 14. Due to the beam splitter 28 allowing light through the surface 32, the light source 50 can be centrally aligned with the top opening 44 and, therefore, the container 12 positioned above the housing 34. The light source 50 can be an LED, for example. Further, the device 26 can include one or more filters 52a, 52b to filter the line-of-sight 30. In one form, when disposed forwardly of the beam splitter 28, such as adjacent to or along the front wall 38, the filter 52a can be an orthogonal polarizer. In another or additional form, the filter 52b can be disposed below the beam splitter 28 and above the light source 50 and can be a linear polarizer. With a configuration having both a linear polarizer and an orthogonal polarizer, the linear polarizer allows lets light waves of the light source 50 having the linear polarization pass therethrough and the orthogonal polarizer allows light waves of the line-of-sight 30 having the orthogonal polarization pass therethrough. In yet another form, the device 26 can include one or more lenses 53 that can be coupled to the housing 34 to extend across the line-of-sight 30 and thereby magnify the examiner's view of the container 12. For example, the lens 53 can be mounted to or disposed adjacent to the front wall 38 and/or top wall 40.

Although, the components have been described above as part of the device having a beam splitter, it will be understood that the device 26 having a mirror, prism, or other diversion component, such as fiber optics or the like, can also incorporate an opaque surface, one or more filters, light sources, and/or lenses.

Figure 4:
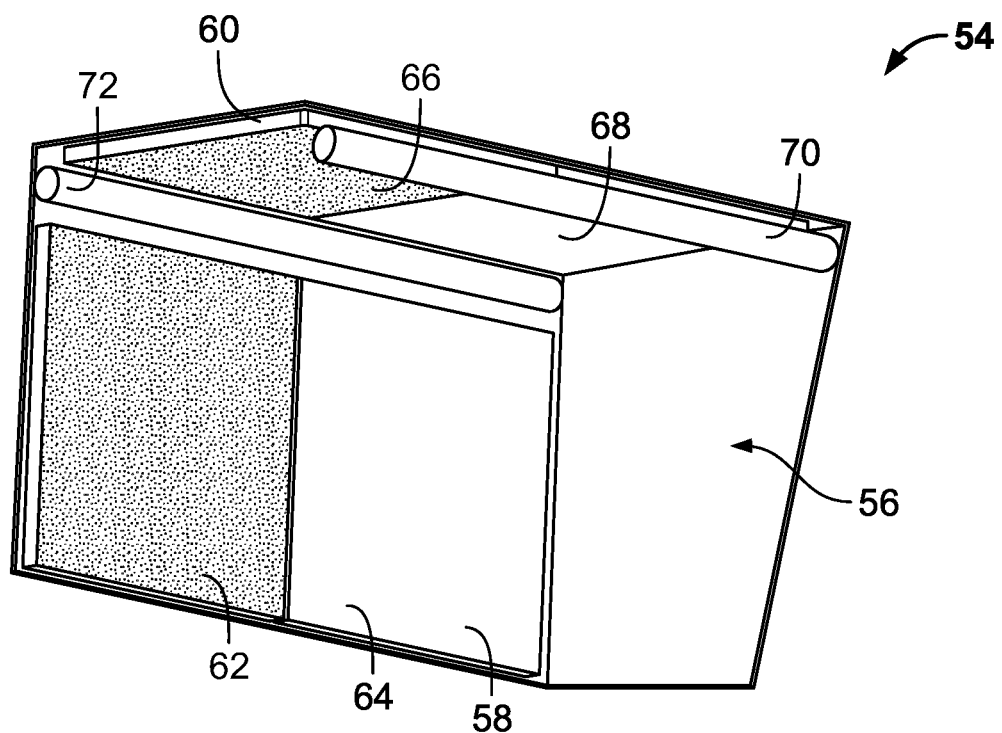
FIG. 4 is a perspective view of an example inspection booth in accordance with various embodiments.

As shown in FIG. 4, the assembly 10 can include an inspection booth 54 having a hood 56 with a rear wall 58 and a top wall 60. Similar to conventional inspection booths, the rear wall 58 of the inspection booth 54 described herein has a binary surface configuration, which can include black and white surface portions 62, 64 as shown. Advantageously, the top wall 60 of the inspection booth 54 can also have a binary surface configuration, which can include black and white surface portions 66, 68. This configuration allows an examiner to inspect a container 12 both in a conventional method horizontally through the sidewall 16 of the container 12 with the rear wall 58 as a backdrop and in the method described herein through the bottom wall 18 of the container 12 with the top wall 60 as a backdrop. If desired, the inspection booth 54 can further include front and back light sources 70, 72 that extend along or adjacent to the top wall 30 at front and rear edges 44, 46 of the top binary surface. The light sources 40, 42 can have an elongate configuration, such as a fluorescent strip or a strip of LEDs.

It can be important to keep the device 26 and the diversion member 28 clean during use to correctly identify any particles 22. Pursuant to this, the device housing 34 can include an outwardly projecting gripping portion 74 for easier handling and to keep a user's hands away from the diversion member 28. Of course, a user could alternatively grip the housing 34 and/or can use airflow to clean any surfaces.

While the above-described device 26 is suitable for handheld use, in some instances it may be helpful to mount the device 26 to the inspection booth 54 for hands-free operation. Pursuant to this, the assembly 10 can include a mounting assembly 100 having a connecting arm 102 and a mount 104. The connecting arm 102 is secured or otherwise coupled to the housing 34 at a first end 106 thereof and is configured to couple to the mount 104 at an opposite, second end 108 thereof. The mount 104 includes a first connection interface 110 configured to couple or be secured to the inspection booth 54 and a second connection interface 112 configured to couple to the connecting arm 102.

If desired, the connecting arm 102 and mount 104 can have portions movable with respect to one another so that the housing 34 can be transitioned between the black and white portions 66, 68 on the top wall 40 of the inspection booth 54, as the transition of the binary configuration can be utilized to identify particles 22.

Figure 5:
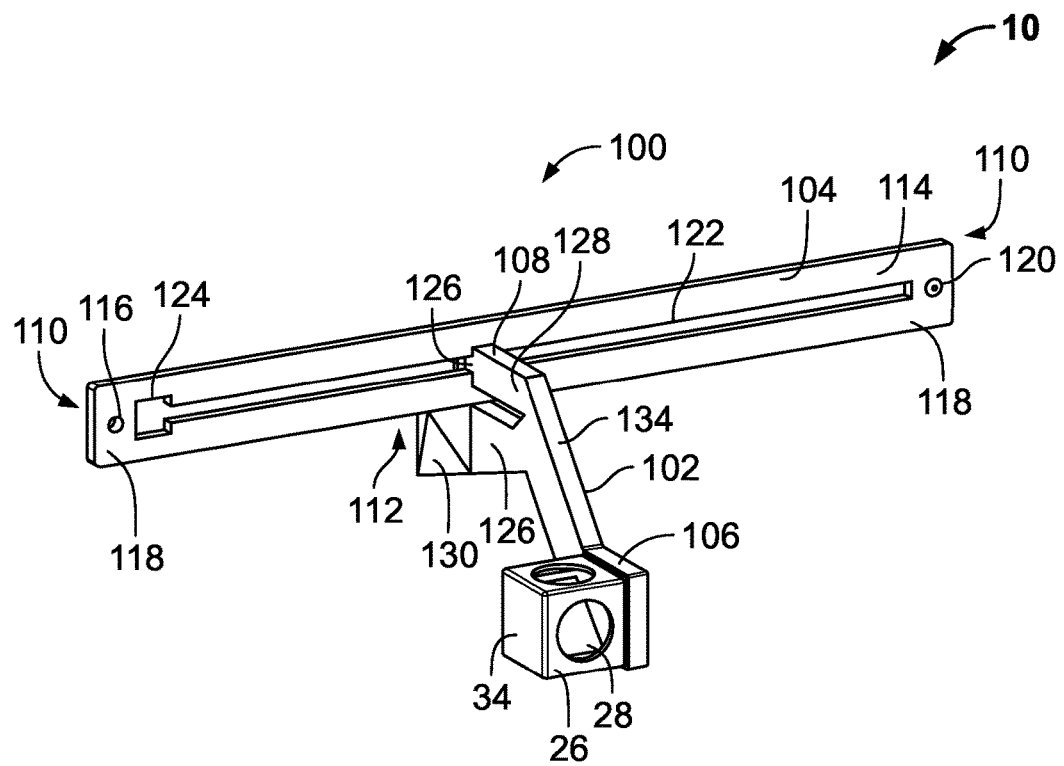
FIG. 5 is a perspective view of a first example mounting assembly for the line-of-sight redirection device of FIG. 3 in accordance with various embodiments.
Figure 6:
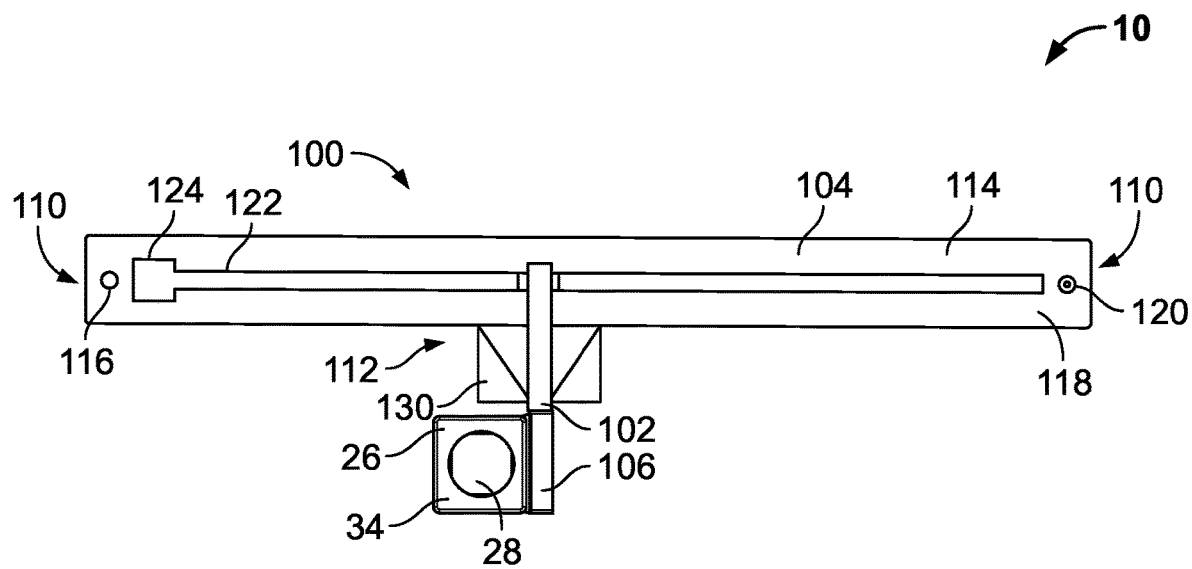
FIG. 6 is a front elevational view of the mounting assembly of FIG. 5.

A first example configuration for the connecting arm 102 and mount 104 is shown in FIGS. 5 and 6. In this form, the mount 104 is an elongate bar 114 and the first connection interface 110 includes openings 116 at opposite ends 118 of the bar 114. In some inspection booths, the rear black and white surfaces 62, 64 are secured to the rear wall 58 using fasteners 120. Advantageously, the bar 114 can be sized to extend across the black and white surfaces 62, 64, such that the openings 116 align with the fastener cavities in the rear wall 58.

Further, the second connection interface 112 of this form includes an elongate slot 122 having an enlarged end portion 124. To couple the connecting arm 102 to the mount 104, the second end 108 of the connecting arm 102 has a slotted configuration with a neck portion 126 sized to be slidably received within the slot 122 of the mount 104 so that adjacent portions 128 of the arm 102 engage the bar 114 and hold the arm 102 in an outwardly extending position. If desired, the second end 108 of the arm 102 can include a downwardly extending foot 130 that is configured to abut and slide along the black and white portions 62, 64 when the arm 102 is coupled to the mount 104 and the neck portion 128 is laterally shifted within the slot 122. As shown, the housing 34 is secured to the first end 106 of the arm 102 so that the device 26 spaced from the rear wall 58 and can be easily used to inspect a container 12. If desired, an intermediate portion 134 of the arm 102 can extend along an angle to position the device 26 at a desired height within the booth 54. For example, when the mount 104 is secured along the top of the black and white portions 62, 64, the intermediate portion 134 can extend at a downward angle as shown. If a higher position is desired, the intermediate portion 134 could alternatively extend horizontally or at an upward angle. Advantageously, the configuration of the mount 104 is reversible, i.e., the bar 114 can be flipped horizontally so that the slot 122 is positioned on the left or right side as desired. Accordingly, an examiner can secure the bar 114 to the inspection booth 54 in a desired configuration, for left-handed or right-handed use for example.

Figure 7:
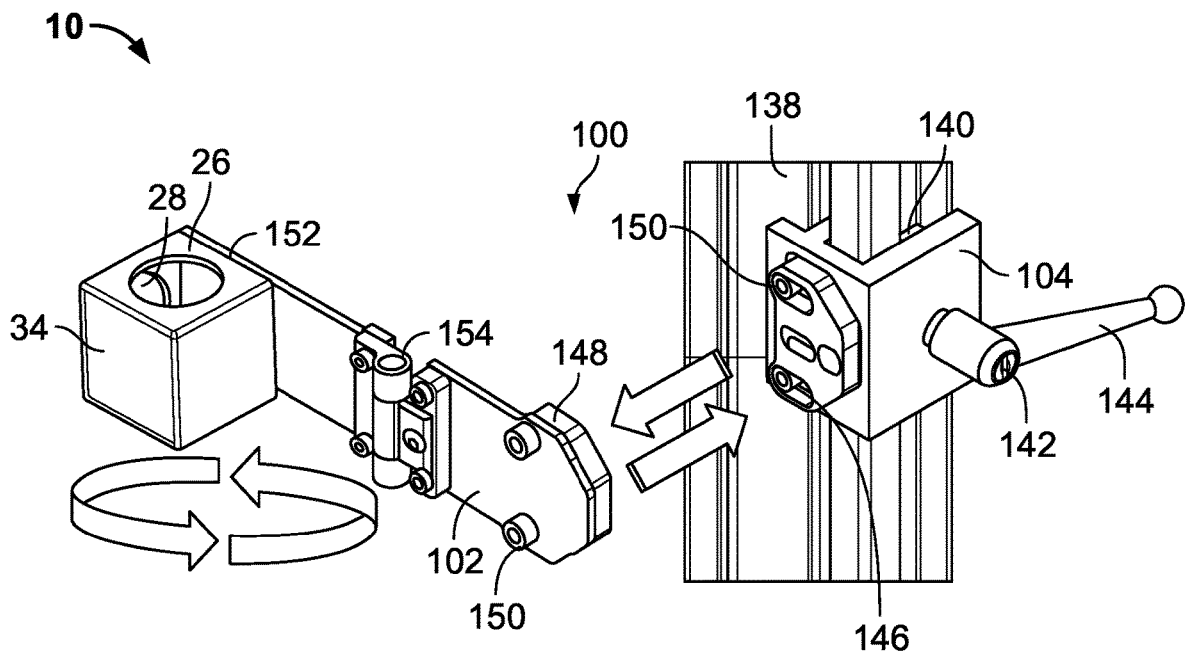
FIG. 7 is an exploded perspective view of a second example mounting assembly for the line-of-sight redirection device of FIG. 3 in accordance with various embodiments.
Figure 8:
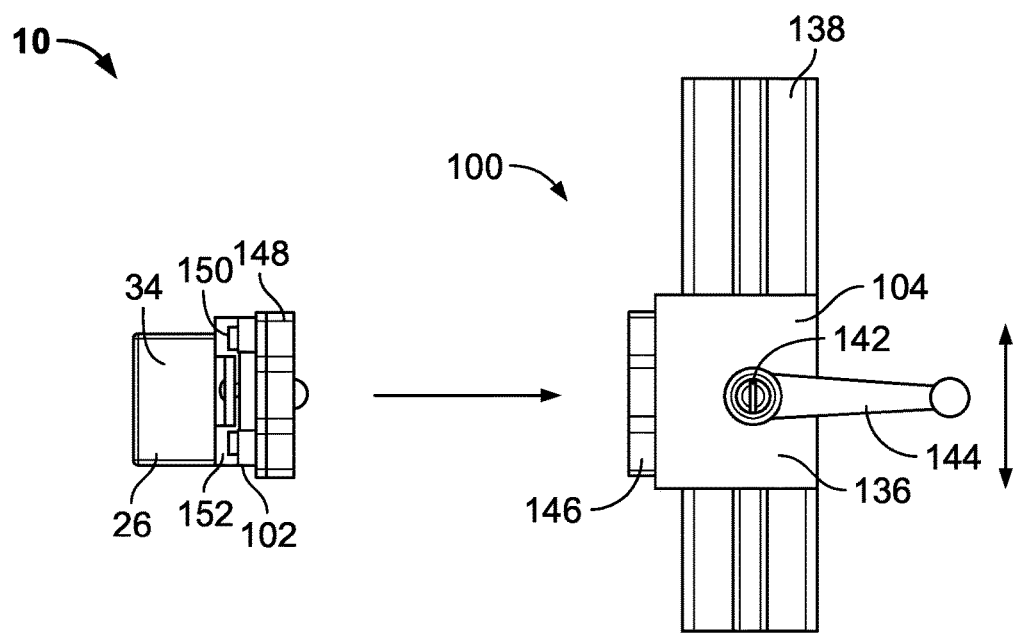
FIG. 8 is a side elevational view of the mounting assembly of FIG. 7.

A second example configuration for the connecting arm 102 and mount 104 is shown in FIGS. 7 and 8. In this form, the mount 104 is a bracket 136 configured to connect to a structure 138 of the inspection booth 54, such as a frame thereof, and the first connection interface 110 includes a coupling portion 140 configured to engage the booth structure 138. In one form, the bracket 136 can be secured to the frame 138 on a lateral side of the inspection booth 54. For example, the booth structure 138 can be T-slotted framing as shown, and the coupling portion 140 can be a T-shaped rib configured to be received within the T-slotted framing. Of course, other structures are suitable, such as tongue-and-groove, clamps, flanges, etc. In the illustrated form, the bracket 136 has an elbow configuration extending around two sides of the booth structure 138, but three-sided brackets, or tubular brackets can alternatively be utilized. In order to secure the bracket 136 to the booth structure 138, the mount 104 can include a fastener 142 that is threaded through the bracket 136 and can be rotated to engage the booth structure 138. If desired, the fastener 142 can include a ratcheting handle 144 to make turning the fastener 142 easier. With this configuration, a user can removably secure the bracket 136, and therefore, the device 26 in a desired location on the inspection booth 54. Further, with the fastener 142, a user can easily adjust the height of the mounting assembly 100 on the frame 138.

Further, the second connection interface 112 of this form includes a magnetic coupling 146 and the connecting arm 102 can include a corresponding magnetic coupling 148. The magnetic couplings 146, 148 can be mounted to the bracket 136 and arm 102 using fasteners 150 for example, although other suitable methods, such as welding, adhesive, bracketing, etc., are within the scope of the this disclosure. The magnetic retention mechanism allows for quick installation and removal so that the assembly 10 can be easily used when needed. If desired, to ensure that the magnetic couplings 146, 148 are positioned correctly with respect to one another, the couplings 146, 148 can include male and female structures 150 disposed on the engagement faces thereof. For example, the male and female structures 150 can have a plug and socket configuration.

As shown, the housing 34 is secured to an outer end 152 of the arm 102 opposite the magnetic coupling 148. In order to allow a user to adjust the positioning of the device 26 within the inspection booth 54, the arm 102 can include a hinge 154 or other pivot connection that allows the device 26 to be pivoted with respect to mount 104.

Figure 9:
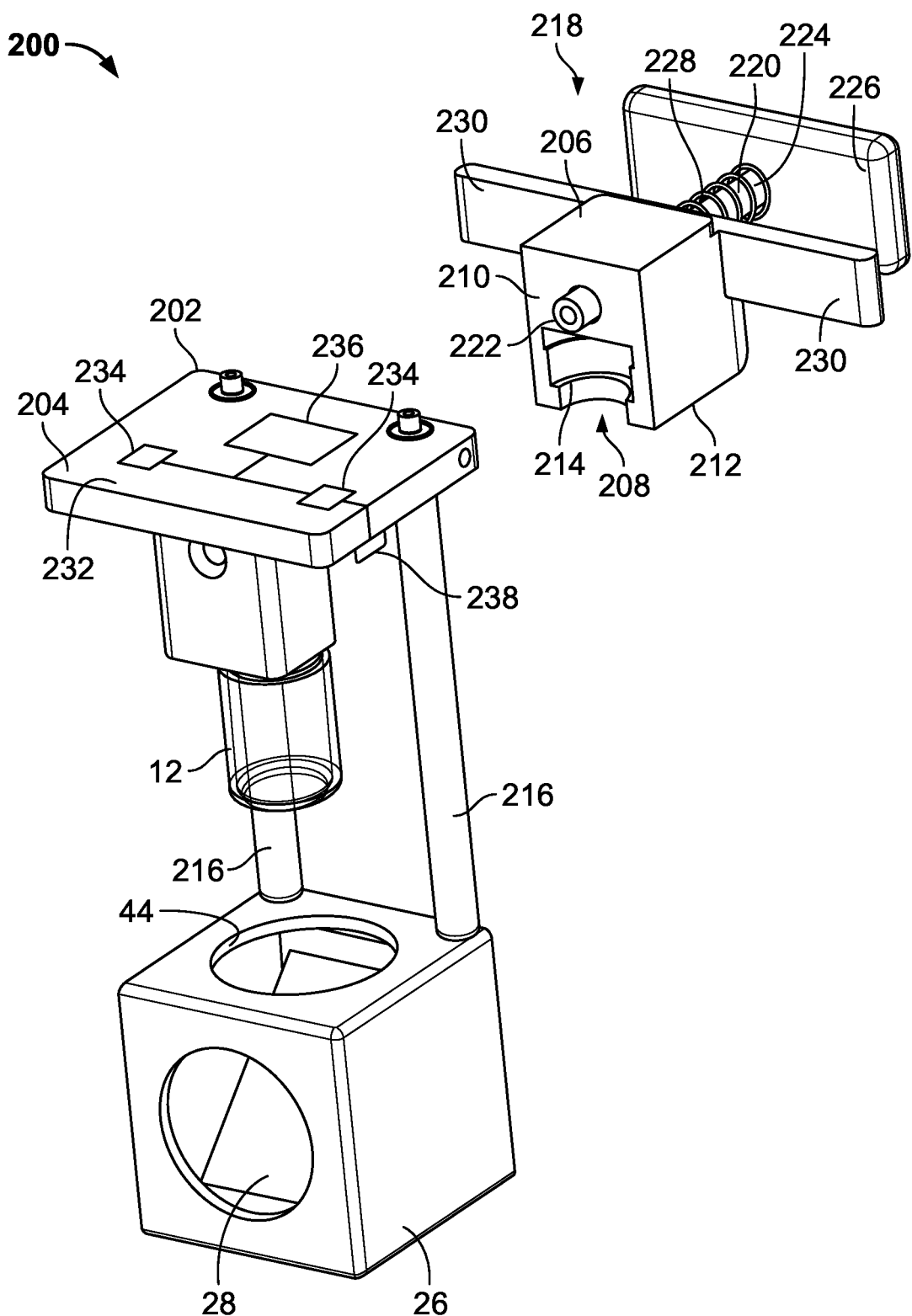
FIG. 9 is an exploded perspective view of a handheld inspection assembly including the line-of-sight redirection device of FIG. 3.

In other forms, as shown in FIG. 9, a handheld assembly 200 is provided that automatically positions the container 12 over the line-of-sight redirection device 26. As discussed below, the assembly 200 can be configured to be used within a suitable inspection booth, such as the booth 54 discussed above, or can be used for more informal container inspections, such as by a physician in an examination room.

The assembly 200 includes a container clamp 202 configured to releasably grasp and hold the container 12 in a position aligned with the top opening 44 of the device 26. The container claim 202 of the illustrated form includes a front clamp portion 204 and a rear clamp portion 206 that are moveable with respect to one another to trap a portion of the container 12 therebetween. Each of the clamp portions 204, 206 includes a cavity 208 formed therein that opens to an interior surface 210 and lower surface 212. The cavities 208 are sized and shaped so that when the clamp portions 204, 206 are moved together with the interior surfaces 210 abutting one another, the cavities 208 combine to form a cavity having a shape complementary to a top of the container 12. So configured, the clamp 202 clamps around the top of the container 12 and allows the bottom of the container 12 hang therebelow. In the illustrated form, the container 12 has a neck 13 and an outwardly protruding flange 15 (FIG. 1) and the cavities 208 include a corresponding inwardly projecting shelf 214 sized to project under the flange 15 when the clamp portions 204, 206 are moved together to retain the container 12 within the clamp 202.

As shown, the device 26 rigidly mounts to the clamp 202, such as to the front clamp portion 204, so hold the clamp 202 and device 26 in a fixed relation to one another, both in distance and rotationally. In the illustrated form, the assembly 200 includes a pair of rods 216 extending between and mounted to the front clamp portion 204 and the device 26. The rods 216 are spaced to lateral sides of the device 26 and clamp portion 204, so that a user has a clear view therebetween, which allows the user to utilize a background behind the assembly 200 when inspecting the container 12. Of course, other versions using a single connector, which can have a non-circular cross-section for example, can alternatively be utilized. In these configurations, the single connector can be offset from the container 12 so that a view therethrough is not obscured. Advantageously, the rods 216 can be sized to position the container 12 in a desired range with respect to the device, such as between about 0.5 inch to about 2 inches, or about 1 inch.

The assembly 200 can further include a biasing assembly 218 that biases the front and rear clamp portions 204, 206 together, so that the clamp 202 holds the container 12 without relying on friction or the user to hold the clamp 202 together. In the illustrated form, the biasing assembly 218 includes a connection member 220 with a distal end 222 that secures to the front clamp portion 204 and a proximal end 224 that secures to a handle 226. The rear clamp portion 206 is slidably disposed on the connection member 220 between the front clamp portion 204 and the handle 226. Finally, the biasing assembly 218 includes a spring 228 that extends around the connection member 220 and is disposed between the handle 226 and the rear clamp member 206. So configured, the spring 228 biases the rear clamp portion 206 toward the front clamp portion 204. Further, the connection member 220 and spring 228 are sized to hold the rear clamp portion 206 in engagement with the front clamp portion 204. In order to ease insertion into and removal from the clamp 202, the rear clamp portion 206 can include laterally projecting handles 230 that extend generally parallel to the handle 226, so that a user can grip the handles 230, 226 to pull the rear clamp portion 206 toward the handle 226 against the biasing force of the spring 228.

As discussed above, the assembly 200 can be used in a variety of settings. For inspections using booths, as discussed, above, the clamp assembly 202 can be transparent above the cavities 208, so that a user can see through the clamp 202 when inspecting the container 12 to thereby utilize the black and white surface portions 66, 68 of the booth top wall 60. Alternatively, the cavities 208 can extend through a top wall 232 of the clamp portions 204, 206 so that the booth top wall 60 is visible through the cavities 208. For more informal inspections without the use of booths, the assembly 200 can be provided with one or more light sources 234 oriented to illuminate the container 12, a power source 236 supplying electricity to the light sources 234, and a switch device 238 to selectively energize the light sources 234. So configured, a user can selectively energize the light sources 234 to visually inspect the container 12 both horizontally directly therethrough, but also vertically through the device 26. Pursuant to this, the assembly 200 can include a back wall, which can optionally include a binary configuration as discussed above, and/or the top wall 232 can have a binary configuration. This is particularly advantageous for downstream inspections, such as by physicians prior to patient delivery.

It should be clear that the methods and containers described above can further comprise a medicament listed below with the caveat that the following list should neither be considered to be all inclusive nor limiting. In some instances, the container is a primary container that is either filled or pre-filled for treatment with the medicament. The primary container can be a cartridge or a pre-filled syringe. The systems, devices, and methods can be used for inspecting parenteral formulations, in particular parenteral formulations comprising biological drugs. Suitable biological drugs include any drug composed of sugars, proteins, such as antibodies (monoclonal antibodies) and related proteins, peptibodies, or nucleic acids or combinations thereof or other biological agents.

Although the assemblies, devices, methods, and elements thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for inspection of a container having liquid product therein, the method comprising:
orienting the container in an upright configuration with a bottom wall of the container extending in a generally horizontal plane;
disposing a line-of-sight diversion member below the container such that the bottom wall of the container is visible therethrough when viewed from a forward position in front of the container; and
shifting the container and the line-of-sight diversion member laterally within an inspection booth to sequentially align the container and the line-of sight diversion member with white and black top surface portions of the inspection booth.

2. The method of claim 1, wherein disposing the line-of-sight diversion member below the container comprises disposing a beam splitter below the container; and further comprising illuminating the container through the beam splitter with an illumination source.

3. The method of claim 2, further comprising filtering a line-of-sight through the beam splitter with one or more polarizers.

4. The method of claim 1, wherein disposing the line-of-sight diversion member below the container comprises:
coupling a mount to an inspection booth via first connection interface of the mount; and
coupling a connecting arm having a housing mounted thereto to the mount via a second connection interface of the mount, the housing having the line-of-sight diversion member received therein.

5. The method of claim 4, wherein coupling the connecting arm to the mount via the second connection interface comprises disposing a slotted end of the connecting arm in an elongate opening of the mount, such that the connecting arm can be shifted laterally within the elongate opening.

6. The method of claim 4, wherein coupling the connecting arm to the mount via the second connection interface comprises magnetically coupling magnet interfaces of the connecting arm and mount together.

7. A container inspection assembly for use with an inspection booth, the container inspection assembly comprising:
a housing;
a line-of-sight diversion member mounted to the housing and oriented to provide a redirected line-of-sight from a position forwardly of the housing to above the housing; and
an inspection booth including a top surface having black and white portions.

8. The container inspection assembly of claim 7, wherein the line-of-sight diversion member comprises a mirror or prism.

9. The container inspection assembly of claim 7, wherein the line-of-sight diversion member comprises a beam splitter; and the housing further comprises an opaque rear surface disposed rearwardly of the beam splitter.

10. The container inspection assembly of claim 8, wherein the housing comprises at least one of a front wall having a front opening therein or a top wall having a top opening therein, the front opening or top opening having a shape corresponding to a cross-sectional shape of the container.

11. The container inspection assembly of claim 7, further comprising one or more filters coupled to the housing and oriented to filter the redirected line-of-sight, the one or more filters comprising orthogonal and/or linear polarizers.

12. The container inspection assembly of claim 7, further comprising a light source coupled to the housing, the light source oriented to illuminate a container positioned over the housing.

13. The container inspection assembly of claim 7, further comprising a lens coupled to the housing to be within the redirected line-of-sight and configured to provide a magnification thereto.

14. A container inspection assembly for use with an inspection booth, the container inspection assembly comprising:
a housing;
a line-of-sight diversion member mounted to the housing and oriented to provide a redirected line-of-sight from a position forwardly of the housing to above the housing; and
a mounting assembly including a connecting arm coupled to the housing and a mount having a first connection interface configured to couple to an inspection booth and a second connection interface configured to couple to the connecting arm.

15. The container inspection assembly of claim 14, wherein the second connection interface comprises an elongate opening and the connecting arm comprises a slotted end configured to be slidably received within the elongate opening such that the connecting arm can be shifted laterally within the elongate opening.

16. The container inspection assembly of claim 14, wherein the second connection interface comprises a magnetic interface and the connecting arm further comprises a magnetic coupling disposed at an end thereof configured to couple to the magnetic interface.

17. The container inspection assembly of claim 16, wherein the connecting arm further comprises a hinge allowing the housing to be movable with respect to the mount.

18. The container inspection assembly of claim 7, wherein the inspection booth further comprises light sources extending along front and rear edges of the black and white portions.

* * * * *